May 17, 1966 G. DE COYE DE CASTELET 3,251,186
PRESSURE LIMITERS FOR HYDRAULIC BRAKES
Filed Dec. 28, 1964
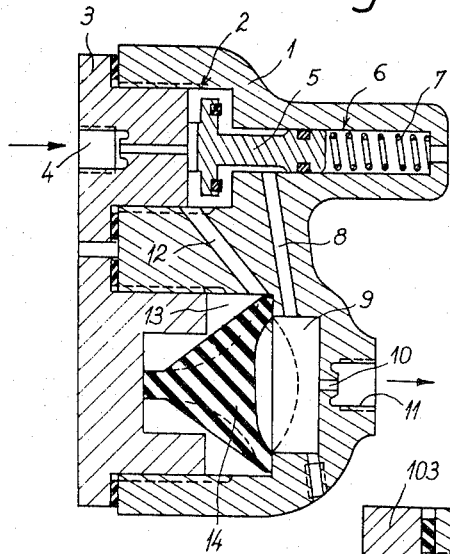
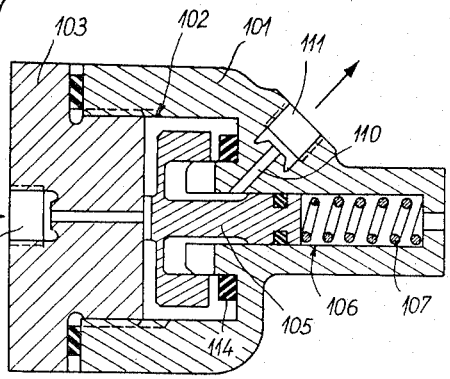
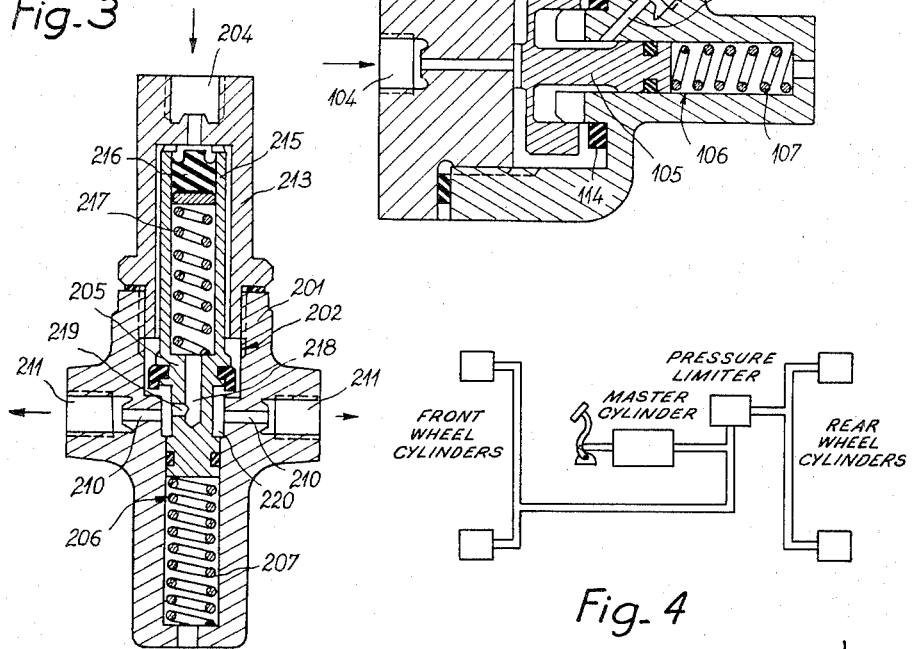
Inventor
Gaëtan DeCoye DeCastelet
By Stevens, Davis, Miller & Mosher
Attorneys United States Patent Office 3,251,186
Patented May 17, 1966

3,251,186
PRESSURE LIMITERS FOR HYDRAULIC BRAKES
Gaëtan de Coye de Castelet, Billancourt, France, assignor to Regie Nationale des Usines Renault, Billancourt, France
Filed Dec. 28, 1964, Ser. No. 421,238
Claims priority, application France, Jan. 10, 1964, 959,971, Patent 1,389,632
3 Claims. (Cl. 60—54.5)

It is already known to resort to pressure limiters for hydraulic brakes which, above a certain pressure value, segregate the circuit feeding the rear wheels. It is also known to use devices which, beyond this pressure, make any further increase in pressure lower in the rear-wheel circuit than in the front-wheel circuit.

In most cases these devices utilize differential pistons, and communication between the supply unit and the rear-wheel circuit is only momentarily interrupted when front and rear pressures are balanced by the differential piston, such communication being restored at least partially each time the feed pressure varies.

The present invention has for its object to enable the same result to be achieved with simpler and more robust means, and accordingly relates to a pressure limiter wherein communication between the feed unit and the rear circuit is completely cut off by a valve of any convenient type when the pressure in said rear circuit reaches a set value, the pressure rise in said rear circuit being thenceforward obtained by a constant mass of fluid trapped therein, to which the feed pressure is partially transmitted through a deformable partition possessing a certain degree of stiffness, or through a piston movable against a countering spring.

The description which follows of a number of possible forms of embodiment of a pressure limiter according to the invention, given with reference to the accompanying non-limitative exemplary drawing, will give a clear understanding of how the invention can be carried into practice.

In the drawing filed herewith,

FIGURE 1 shows in section a pressure limiter in which the deformable partition is a block of rubber or resilient plastic material;

FIGURE 2 shows a disposition wherein the obturating element of suitable size of the communication-controlling valve retains a degree mobility subsequent to closure and accordingly bears against a deformable seat;

FIGURE 3 illustrates a constructional form in which a reduced pressure is transmitted by means of a piston movable against a countering spring within the valve obturating element itself; and FIGURE 4 illustrates the invention inserted in a braking system.

Referring first to FIGURE 1, the pressure limiter shown thereon consists of a main casting 1 having formed therein a first cylindrical bore 2 obturated by a plug 3 to which is connected, as at 4, the pipe conveying the fluid set under pressure by a feed unit (not shown).

This pressure is exerted on a valve obturator 5 guided in a cylindrical bore 6 which is coaxial and co-extensive with the bore 2 but of smaller diameter.

A spring 7 positioned at the bottom of the bore 6 keeps the valve 5 open as long as the feed pressure has not reached a certain value. The fluid which then flows through the passage 8 reaches the cylindrical cavity 9 and, via 10 and 11, the pipe feeding the brake circuit of the rear wheels of the vehicle.

The cavity 2 also communicates, through the passage 12, with the cylindrical cavity 13 coaxial with and of slightly greater diameter than the cavity 9.

These latter-mentioned two cavities are separated by a deformable partition consisting of a block of rubber or plastic material 14.

When the feed pressure reaches a value that is a function of the stiffness of the spring 7 (and which can therefore be adjusted at will), the valve 5 cuts off communication between 2 and 9, i.e. between the feed and the rear-wheel brake circuit. Thenceforward, any increase in the feed pressure is only partially transmitted, through the medium of the deformable block 14, to the fluid trapped in said circuit.

It will readily be apparent that the pressure rise in such a given circuit of known elasticity will be a function of the deformation characteristics of the block 14. Therefore by imparting to said block an appropriate shape and characteristics, it is possible to obtain any desired pressure variation pattern in the rear-wheel brake circuit as a function of the feed pressure.

Referring next to FIGURE 2, the arrangement shown thereon is basically analogous to that of FIGURE 1 but is devised in more compact form.

In this embodiment, like parts are designated by like numerals augmented by 100. As is clearly shown, the obturator of the valve 105 which cuts off communication between the feed circuit and the rear-wheel brake circuit is adapted to bear against a seat consisting of a deformable washer-gasket 114. Subsequent to closure of this valve, the pressure prevailing in this circuit consequently continues to vary as a function of the feed pressure and as a function of the deformability characteristics of the washer-gasket 114.

Referring lastly to FIGURE 3 for an embodiment differing substantially from the previous two constructional forms, the valve obturator 205 is guided in a cylindrical bore 206 and held open by a spring 207 as long as the feed pressure does not reach a predetermined value.

Opposite its guiding means, the obturator 205 is extended by a hollow cylindrical portion 215 through which a piston 216 is movable against the countering action of a spring 217.

The internal cavity of the portion 215 communicates through passages 218 and 219 with the chamber 220 of a main casting 201 which also contains port passages 210 providing access to orifices 211 to which are connected the pipes feeding the brake units of the rear wheels. When the feed pressure reaches a certain value dependent upon the strength of the spring 207, the valve 205 cuts off communication between 204 and 211, i.e. between the feed and the rear-wheel brake circuit.

Thenceforward, any increase in the feed pressure causes the piston 216 to move against the spring 217. The force resulting from the increased feed pressure is thus partly absorbed in compressing the spring 217, whence the pressure increase in the rear-wheel brake circuit is less than the increase in the feed pressure.

Manifestly, the spring 217 can have a shape and characteristics imparted to it such that the ratio of the rise in the pressure in the rear brake circuit to the rise in the feed pressure not be linear.

The present invention is likewise applicable to limiters of the type in which the control spring, as exemplified by the spring 7, 107 or 207, is more or less compressed as a function of the load on the back axle. This in no way modifies the underlying principle of the mechanism according to the invention, which invariably operates only after the valve or main slide-valve has closed.

I claim:

1. A pressure limiter for hydraulic brakes comprising a valve mechanism inserted between a master cylinder and rear wheel brake cylinders, said valve mechanism comprising a cylindrical casing having an inlet and an outlet, a valve member and valve seat within said cylinder defining a first chamber between said valve and said inlet and a second chamber between said valve and said outlet, said valve in its open position allowing communication between said chambers, means biasing said valve open, said valve being closed by fluid pressures from the master cylinder exceeding a predetermined pressure which may be variable in the function of the load on the rear axle, an elastically deformable pressure responsive element of non-linear characteristics connected between said input and the body of fluid which is isolated in said second chamber and said rear wheel brake cylinders by the closure of said valve, whereby fluid pressures exceeding that required to close said valve are transmitted to the rear brake cylinders partly only in response to the deflection characteristics of said pressure responsive element.

2. A pressure limiter for hydraulic brakes according to claim 1 wherein said pressure responsive element is a spring biased piston.

3. A pressure limiter for hydraulic brakes comprising a valve means inserted between a master cylinder and rear brake cylinders, said valve means comprising a casing having an inlet and outlet, a valve within said casing defining a first chamber between said inlet and said valve and a second chamber between said valve and said outlet, means biasing said valve in a normally open position providing communication between said first and said second chambers, a pressure responsive element connected between said first and said second chambers, said pressure responsive element being a piston movable against biasing means, said valve in its closed position isolating a predetermined quantity of fluid between said valve and said rear brake cylinders, said pressure responsive element being deformed by fluid pressure exceeding that necessary to close said valve thereby exerting additional limited pressure on said isolated fluid.

References Cited by the Examiner

UNITED STATES PATENTS 2,835,271   5/1958   Oberthur  _____ 60—54.5 X
3,087,761   4/1963   Stelzer  _____ 303—6 X

OTHER REFERENCES

German printed application No. 1,090,116, Sept. 1960.

SAMUEL LEVINE, *Primary Eaminer.*

ROBERT R. BUNEVICH, *Examiner.*